United States Patent [19]

Mondet et al.

[11] Patent Number: 5,782,606
[45] Date of Patent: Jul. 21, 1998

[54] DEVICE FOR FOLDING A ROTORCRAFT ROTOR BLADE

[75] Inventors: Jean Joseph Henri Mondet, Pelissanne; Vincent Scala, Lancon de Provence, both of France

[73] Assignee: Eurocopter France, Marignane Cedex, France

[21] Appl. No.: 769,061

[22] Filed: Dec. 18, 1996

[30] Foreign Application Priority Data

Dec. 22, 1995 [FR] France .................. 95 15389

[51] Int. Cl.⁶ .................................................. F04D 29/26
[52] U.S. Cl. .................................. 416/142; 416/143
[58] Field of Search .......................... 416/142, 143, 416/131, 132 R

[56] References Cited

U.S. PATENT DOCUMENTS 3,135,333  6/1964  Cruz.
4,436,483  3/1984  Watson ............................ 416/143
5,249,926  10/1993  D'Anna et al. ................... 416/142
5,322,415  6/1994  White et al. ...................... 416/142
5,716,193  2/1998  Mondet et al. ................... 416/143

FOREIGN PATENT DOCUMENTS 0 057 053  8/1982  European Pat. Off..

OTHER PUBLICATIONS

Thirteenth European Rotorcraft Forum "Electromechanical blade fold systems: current status and future developments". Sep. 8–11, 1987 in Arles (France).

*Primary Examiner*—John T. Kwon
*Attorney, Agent, or Firm*—Henderson & Sturm

[57] ABSTRACT

The folding device comprises a fitting pivoting on a cuff about a folding axis which is offset laterally thanks to two lateral bearings of the fitting journal-mounted about bushings retained in lateral devises of the cuff and which are coaxial about the axis by pegs for centering a maneuvering actuator for maneuvering the fitting and the blade about the folding axis.

16 Claims, 8 Drawing Sheets

DEVICE FOR FOLDING A ROTORCRAFT ROTOR BLADE

The invention relates to a device for folding a rotorcraft rotor blade, for a rotor of the type comprising a hub mounted so that it can rotate about an axis of the rotor, and to which each blade is connected by a linking member which is substantially radial with respect to the axis of the rotor and is itself connected to the hub by retaining and articulating means, each blade being secured by its root to a folding fitting mounted so that it can pivot about a folding axis on said linking member, between two positions, one of which is a flight position in which the fitting is fixed to said linking member in such a way that the blade has its longitudinal axis aligned with that of said linking member and is in the substantially radial extension of said linking member, and the other of which is a folded position, in which the fitting and the blade are pivoted about the folding axis substantially on one side of said linking member.

Rotors of this type, with a device for folding each blade which includes a fitting which holds the blade by its root and, on the one hand, allows the blade to be rotated with the fitting about an axis which is stationary with respect to the linking member, which is the folding axis constituting a minimum link between the linking member and the fitting and, on the other hand allows active and reactive forces generated by folding or deploying (pivoting into its flight position) the blade to be transmitted, have already been used, especially as main rotors for helicopters on board ships, to allow automatic and non-manual folding and deployment of each blade using a maneuvering and locking actuator. Each actuator is mounted on a corresponding linking member and controls the locking of the blade in the deployed (flight configuration) position and in the folded position, as well as pivotings of the blade from one of its two limiting positions to the other about a pivot axis passing through the fitting and the linking member substantially at right angles to their longitudinal axis and retained by a nut itself retained by safety means which are mandatory for a vital link.

The drawback of these known embodiments is that their pivoting link does not remain non-dismantleable during the operations of folding or of unfolding the blades and/or that the means of retaining the nut which provide a double safety feature are means whose mass and bulk, especially on each side of the linking member, are far from being negligible, and that their presence may hamper the blade-folding kinematics.

The problem upon which the invention is based is that of overcoming at least one of the aforementioned drawbacks, and that of proposing a device for folding a blade which allows fixing with a double safety feature which remains non-dismantleable during the operations of folding and of unfolding the blades, and which furthermore has minimum bulk around the corresponding linking member and gives an important saving in weight for the flapping weight which each blade with its folding fitting and linking member and various components mounted on these elements constitute.

Another object of the invention is to propose a blade-folding device which affords all the required safety without hampering the kinematics of folding or of unfolding the blades.

To this end, the folding device of the invention is one which comprises a pivoting articulation which is offset laterally with respect to the longitudinal axis of the linking member, and by means of which the fitting is mounted so that it can pivot on the linking member about the folding axis, the articulation comprising, on the linking member just as on the fitting, two lateral bearings, secured respectively to one and the same side of the linking member and of the fitting and which are coaxial about the folding axis while at the same time being axially offset from one another along this folding axis, and two stepped bushings are mounted coaxially about the folding axis, each in respectively one of the two lateral bearings of the linking member and in respectively one of the two lateral bearings of the fitting, the two bushings also being mounted in opposition, each having a radially external step at its end pointing toward the other bushing, and facing a body retained on the linking member between the two bearings thereof and between the two bearings of the fitting, and a centering peg being mounted coaxially and retained axially in each of the two bushings in such a way that an end part of the peg projects axially out of the bushing beyond its step and is engaged and centered in respectively one of two corresponding centering housings of said body.

The use of a pivoting articulation of this type, with two stepped bushings and two centering pegs effectively gives a fixing which is non-dismantleable during pivotings of the blade about the folding axis, without requiring the presence of a nut and of means of retaining the nut to provide a double safety feature, as was the case with the embodiments of the state of the art.

Advantageously, each of the two lateral and coaxial bearings of the linking member is a double bearing formed by respectively one of two radially external and lateral pivot devises arranged on said linking member on each side of a plane at right angles to the folding axis and passing through the longitudinal axis of said linking member, and each of the two lateral and coaxial bearings of the fitting is journal-mounted between the two arms of respectively one of the two pivot devises and about respectively one of the two bushings which passes through coaxial passages formed in said arms of the corresponding pivot clevis, which improves safety and the balance of the folding device using a structure which is substantially symmetric on each side of the plane of rotation of the rotor.

In an advantageously simple and economical way, each peg is retained axially in the corresponding bushing by a step of the peg in abutment against an internal step of said bushing under the thrust of a threaded plug screwed into a tapped bore formed in the end of the bushing on the opposite side to its step for bearing on the body. To guarantee that the peg is kept in the bushing, opposing the working-loose of the plug, the latter advantageously has passing through it substantially at right angles to the axis of the bushing and of the peg, a safety pin retained in cutouts formed at the periphery of the tapped bore of the bushing. Such a pin also makes it possible to check the presence of the peg in the bushing, because this peg is not visible when the assembly is mounted. Now, in the absence of the peg, the plug can be screwed further into the bore of the bushing so that the pin cannot be put in place in the cutouts of the bushing and passed through the plug. In order to make it easier to withdraw the peg, when dismantling the device, the end of each peg on the same side as the corresponding threaded plug exhibits a tapped blind axial bore intended to accommodate, by screwing, tooling for extracting the peg from the corresponding bushing.

If sealing is required between the bushing and the peg, then at least one sealing ring may be mounted in the tapped bore of the bushing, around the threaded plug or, as an alternative, at least one annular seal is mounted between the bushing and part of the corresponding peg inside this bushing, and at least one other annular seal may be mounted, around the peg, in the bearing face of the radially external step of the bushing.

In order favorably to fix the fitting to the linking member in the flight configuration, the fitting advantageously has, on the opposite side to its two lateral bearings at least one lateral lug which, in the flight position, points toward said linking member and is housed in a cavity open radially toward the outside on said linking member and is retained in said cavity by a catch of an actuator for locking the fitting on the linking member in the flight position. In order to obtain reliable operation using simple means, said cavity of the linking member is advantageously delimited between the two arms of a radially external locking clevis arranged laterally on said linking member and the two arms of which have passing through them coaxial passages of axis substantially at right angles to the folding axis and to the longitudinal axis of said linking member, said corresponding lug of the fitting extending in a plane substantially parallel to the common longitudinal axis of the fitting and of the blade and to the folding axis, and being pierced with a transverse passage of axis substantially at right angles to said longitudinal axis common to the blade and to the fitting and to said folding axis, said lug being retained in said locking clevis of the linking member by a locking rod which can be retracted axially by the locking actuator and is intended to pass through the coaxially-aligned passages of the locking clevis and of the lug, in the flight position.

Furthermore, good dynamic balance of each flapping mass is ensured if the device advantageously comprises two locking lugs on the fitting, two locking devises on the linking member, as well as two locking rods of at least one electromechanical locking actuator arranged on the linking member between the two lateral bearings on one side and the two lateral locking devises on the other side of the longitudinal axis of said linking member, said lugs, devises and locking rods being arranged on each side of the plane at right angles to the folding axis and passing through the longitudinal axis respectively of the linking member and of the fitting and the blade.

In the event of a mounting without maneuvering actuator, the body between the stepped bushings is tooling mounted on the linking member in such a way as to center it on the two pegs of the stepped bushings and possibly take up the forces acting upon the locking actuators.

By contrast, in the event of mounting with maneuvering actuator, for a rotor in which the blades are folded and unfolded automatically, the body between the two stepped bushings is advantageously and specifically the body of the maneuvering actuator driving the fitting and the blade in pivoting about the folding axis, and at least partially housed in a part shaped as a cuff of the linking member, said maneuvering actuator comprising a moving output member mounted so that it can rotate about the folding axis and driving in coaxial rotation a driven member integral with the fitting.

This moving output member of the maneuvering actuator may comprise a two-pronged fork, for example, maneuvered about the folding axis and between the two tines of which is driven a receiving finger integral with the fitting which is thus pivoted in folding and in unfolding. However, it is advantageous for this moving output member of the actuator to comprise a driving finger which is substantially radial with respect to the folding axis and for said driven member to be an aperture in the fitting, through which the driving finger passes. In a simple way, this finger may be a driving bushing equipped with at least one axial stop for retaining the bushing in the aperture of the fitting and which is fixed on a radial boss of an output rotary member of the drive actuator by a threaded central rod passing through the bushing partially fitted into said boss and screwed into said boss. In this case it is advantageous for the fitting to include a radially external clevis, the clevis bottom of which has said aperture, and in which the blade root is retained by two spindles which are substantially mutually parallel and parallel to the folding axis, one of which spindles is advantageously removable to give access to the aperture in the fitting and to the threaded rod for fixing the driving bushing by pivoting the blade on the fitting about the other spindle.

In addition, if the blade is equipped with a device for discharging electrostatic charge and allowing lightning current to pass, which comprises an electrically conducting element visible on the radially internal end of the blade root facing the bottom of the outer clevis of the fitting, it is advantageous for the rod for fixing the driving bushing to have a head clamped against the bushing with the interposition of an electrically conducting washer equipped with a curved leaf spring kept in elastic contact with said electrically conducting element of the blade root, thus placed in electrical continuity with the linking member via the washer and the leaf spring, the fixing rod and/or the drive bushing, the boss and the output rotary member of the maneuvering actuator.

In addition, to make it easier to mount and control the maneuvering and locking actuators on the linking member it is advantageous for these actuators to have a common body mounted on said linking member.

Such a folding device has the attraction of combining the articulation of the folding fitting on the linking member and the linking of the fitting to the single actuator associated with the linking member for operating and locking the folding fitting.

Further advantages and features of the invention will become clear from the description given herein below by way of non-limiting example of embodiments which are described with reference to the appended drawings in which.

Figure 1:
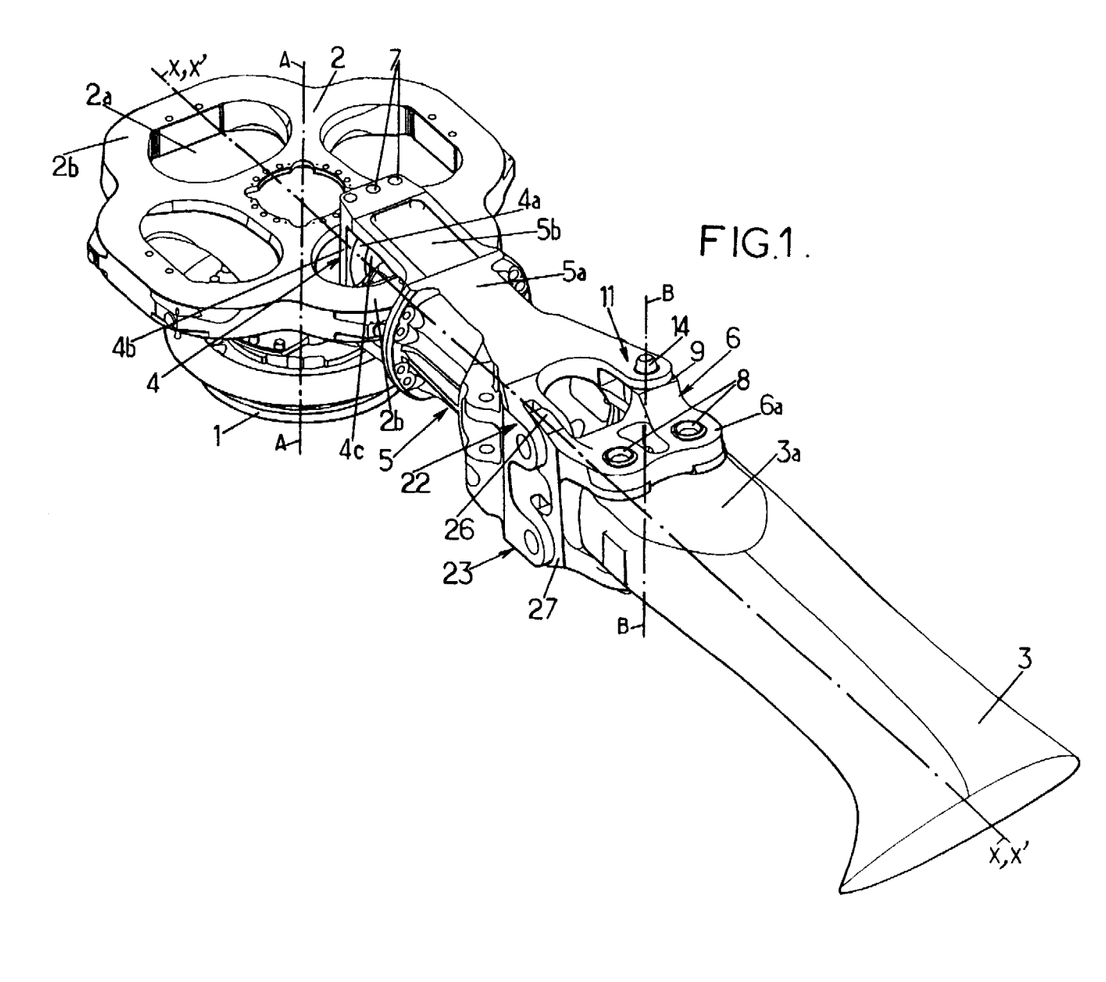
FIG. 1 is a diagrammatic partial view in perspective of the head of a four-bladed rotor, on which head just one blade has been represented connected to the hub by a cuff-shaped linking member with a folding fitting in which the blade root is retained, the blade and the fitting being unfolded into the flight position.

FIG. 1 partially represents the head of a helicopter four-bladed main rotor, the tubular rotor mast 1 of which is integral, via its upper part, with a hub 2 rotating with it about the axis of rotation A—A of the rotor. The hub 2 is arranged as a radial (with respect to the axis A—A) plate with cavities having, for each of the four blades 3 of the rotor, one cavity 2a passing axially through a radially external part of the plate of the hub 2 in order to partially accommodate the means 4 for retaining and articulating to the hub 2 a member 5 for linking the hub 2 to the corresponding blade 3, via a folding fitting 6 which retains the blade 3 and is mounted so that it can pivot about a folding axis B—B which is stationary on the member 5.

Figure 2A:
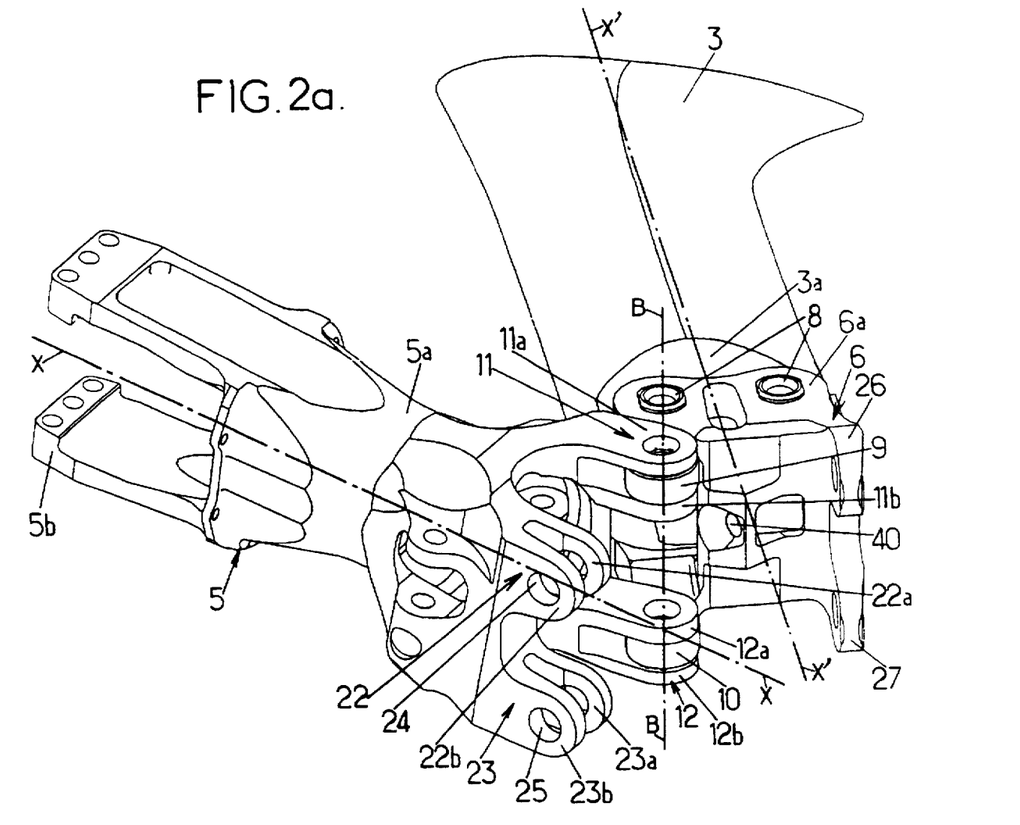
FIGS. 2a and 2b are views in perspective respectively of the blade and of the fitting in the position folded with respect to the linking member, without combined maneuvering and locking actuator nor pivoting link, and of the combined actuator before it is mounted in the device of FIG. 2a, FIG. 3a and 3b are views similar to FIG. 2a with the actuator mounted on the linking member and, respectively, without pivoting link between the linking member and the fitting nor link for rotational drive between the actuator and the fitting, and with these two links.
Figure 3A:
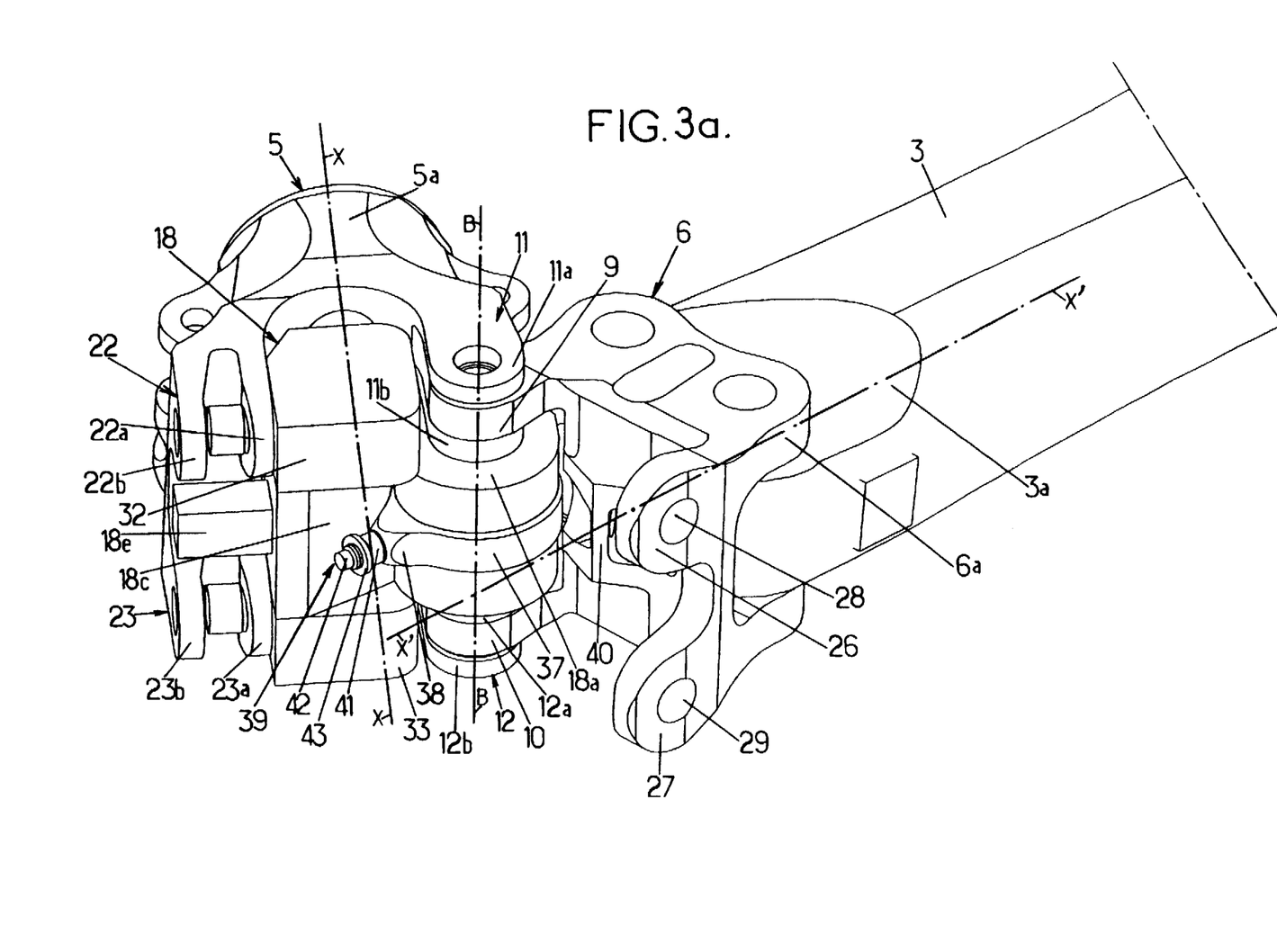
Figure 3B:
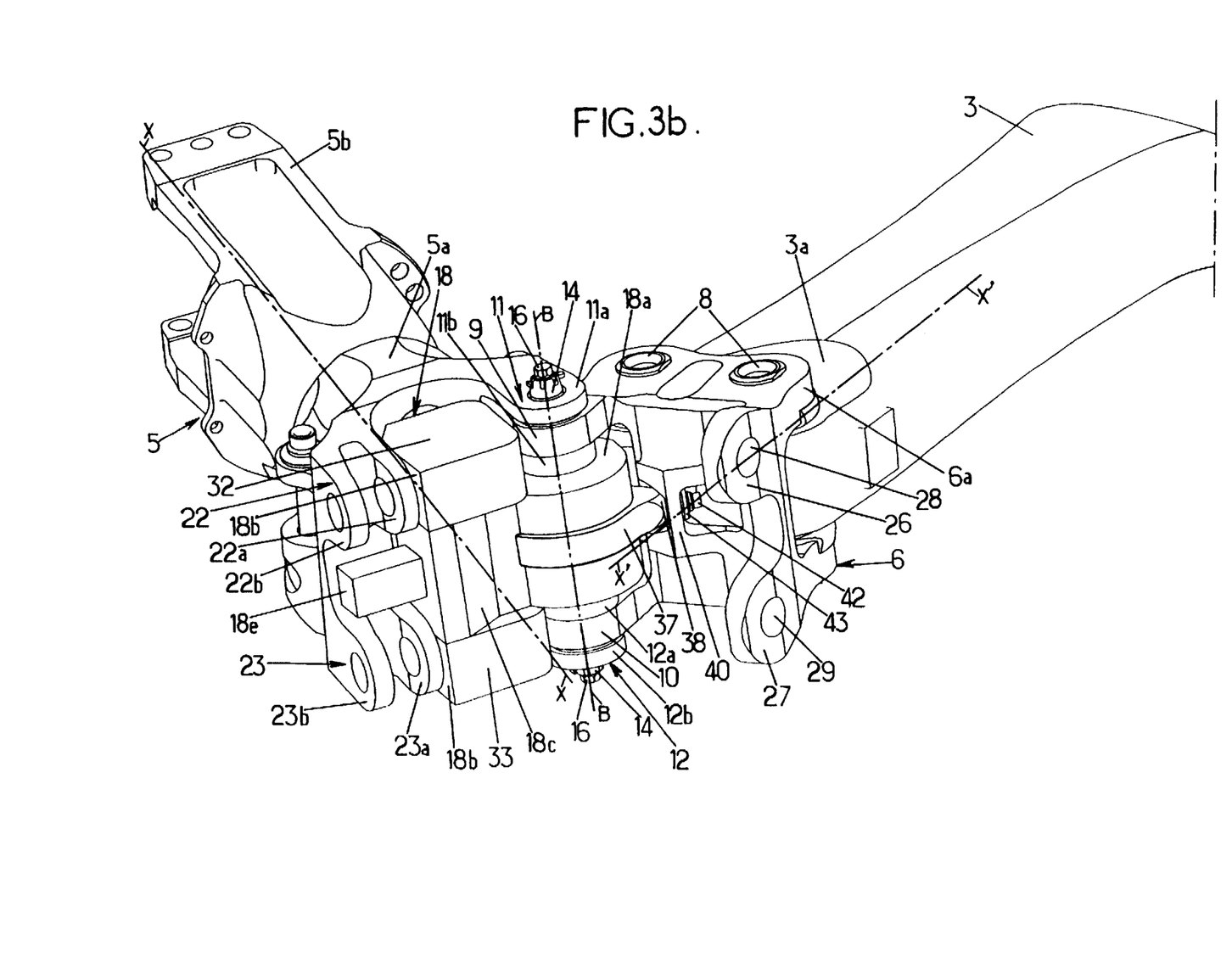

As represented also in FIGS. 2a, 3a and 3b, the linking member 5, called a cuff in the rest of the description, because its central part 5a is tubular, is a member arranged substantially radially with respect to the axis A—A of the rotor, and the radially internal end part of which is arranged as an internal clevis 5b, the two parallel arms of which provide the link to the retaining and articulating means 4.

In a known way, these means 4 (represented only in FIG. 1) consist of a laminated spherical stop comprising a central part 4a consisting of an alternating stack of layers of an elastically deformable material and of cups made of a rigid material in the shape of portions of spheres between, on the one hand, a radially internal armature 4b passing through the cavity 2a and fixed as a spacer piece between the arms of the internal clevis 5b by three bolted rods represented diagrammatically as 7 and, on the other hand, a radially external armature 4c straddling the radially external edge 2b of the corresponding cavity 2a of the hub 2 and fixed to this edge 2b of the hub by bolted rods (not represented).

Figure 5:
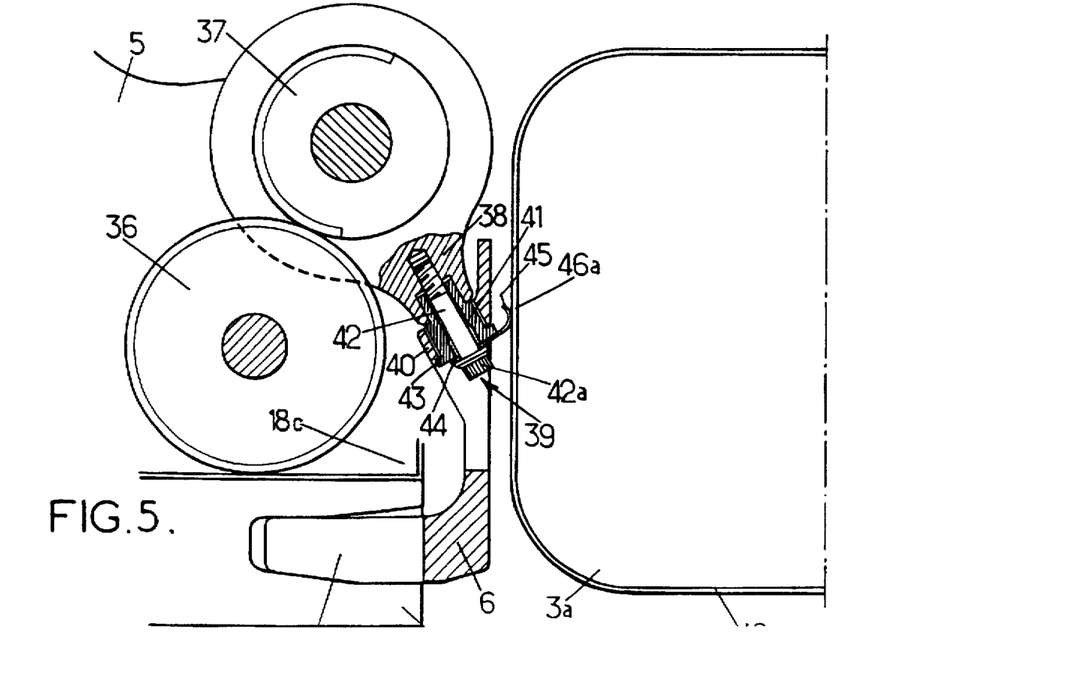
FIG. 5 is a diagrammatic partial representation, partly in plan and partly in horizontal section, showing the link for rotational drive between the fitting and the actuator of the device of FIG. 3b.

The blade root 3a is retained between the two parallel arms of a radially external clevis 6a of the fitting 6 by two spindles 8 which are mutually parallel and substantially parallel to the axis A—A of the rotor and are symmetric on each side of the common longitudinal axis X'—X' of the fitting 6 and of the blade 3, being substantially at right angles to this longitudinal axis X'—X', one of the spindles 8 being removable so that the blade 3 can be folded manually after the rotor has come to rest, by pivoting with respect to the fitting 6 about the other spindle 8 in order, as described herein below with reference to FIGS. 3a, 3b and 5, to access the members for coupling a maneuvering actuator to the fitting 6 for driving the latter in rotation about the folding axis B—B.

For its pivoting connection to the cuff 5, and as may be seen in FIGS. 2a, 3a, 3b and 4, the fitting 6 has, on the opposite side to the radially external clevis 6a along its longitudinal axis X'—X', two lateral bearings 9 and 10 which are offset laterally on one and the same side of the axis X'—X' on the fitting 6 and project axially on the opposite side to the clevis 6a. The bearings 9 and 10 each consist of respectively one of two generally cylinder-shaped lugs which are mutually parallel and parallel to the plane at right angles to the folding axis B—B and passing through the longitudinal axis X'—X', called the plane of rotation of the blade 3, the two cylindrical lugs being substantially symmetric on each side of this plane of rotation, spaced apart along the folding axis B—B and having passing through them cylindrical bores of the same diameter and coaxial about the axis B—B so as to form an upper bearing 9 and a lower bearing 10.

The cuff 5 also has two bearings 11, 12 which are coaxial about the folding axis B—B and are offset laterally on the cuff 5 on the same side of its longitudinal axis X—X. The two bearings 11, 12 of the cuff 5 are spaced apart along the axis B—B and substantially symmetrical with one another on each side of the plane at right angles to the axis B—B and passing through the longitudinal axis X—X of the cuff 5 and which is the plane of rotation of the blade 3 when the latter and the fitting 6 are locked in the flight configuration on the cuff 5 and occupy the position of FIG. 1. Each of the bearings 11 and 12 of the cuff 5 is a double bearing formed by one respectively of two radially external and lateral pivot devises each consisting of an upper arm 11a or 12a and of a lower arm 11b or 12b which projects substantially radially outward on the radially external part of the cuff 5 (with respect to the rotor axis A—A), spaced apart along the axis B—B and parallel to one another and to the plane of rotation of the blade, the four arms 11a, 11b, 12a and 12b of the devises having passing through them cylindrical bores which are coaxial about the axis B—B and have substantially the same diameter as the bores of the bearings 9 and 10 of the fitting 6 (see FIG. 4).

The cuff 5 thus has two lateral and coaxial double bearings of which one 11a, 11b is an upper one and the other, 12a, 12b is a lower one on its radially external part.

Figure 4:
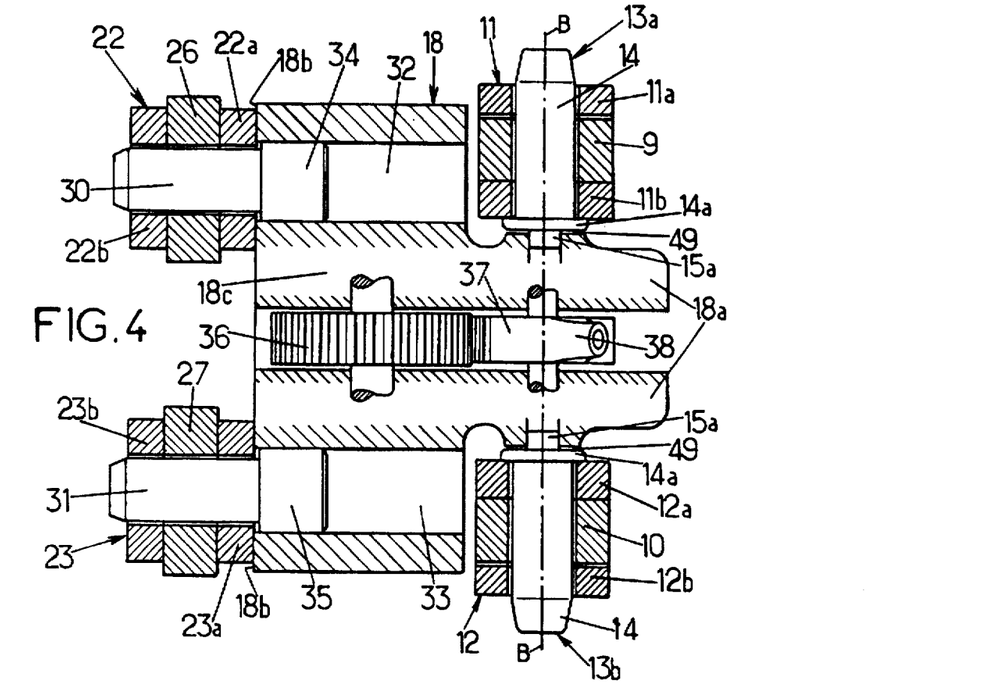
FIG. 4 is a diagrammatic view partially in side elevation and partially in cross-section on the folding axis and the locking rods of the device of FIG. 3b.
Figure 6:
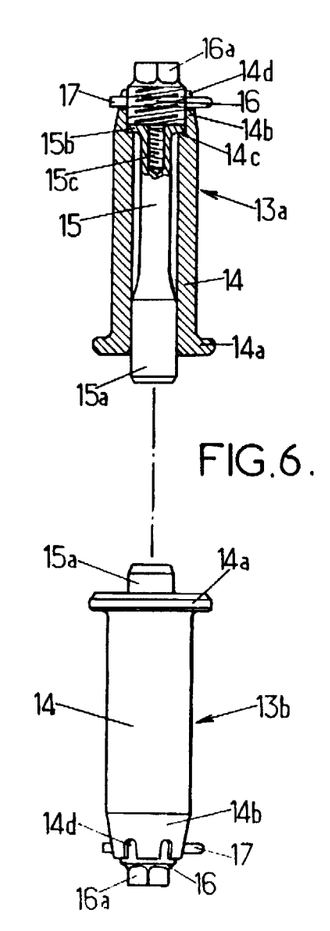
FIG. 6 is a view of the two subassemblies of the pivot for folding the fitting on the linking member, in side elevation for the lower subassembly and partly in axial section and partly in side elevation for the upper subassembly in the figure.

As may be seen in FIGS. 3b and 4, each upper lateral bearing 9 or lower lateral bearing 10 of the fitting 6 is journal-mounted between the two arms 11a and 11b or 12a and 12b of the lateral and radially external upper pivot clevis 11 or lower pivot clevis 12, about a bushing 14 retained coaxially around the folding axis B—B in the bores of the corresponding two arms 11a and 11b or 12a and 12b and belonging respectively to the upper subassembly 13a or lower subassembly 13b which assemblies together constitute the folding pivot, as represented in FIG. 6.

In this example, the two subassemblies 13a and 13b are identical and mounted in opposition, each of them essentially comprising the bushing 14 and a centering peg 15. Each of the bushings 14 is a cylindrical tubular bushing of circular section, the inside and outside diameters of which are calibrated, over most of its length, from an end pointing toward the other bushing 14 and surrounded by a radially external step 14a, as far as the opposite end 14b of frusto-conical external shape converging in the direction away from the step 14a. Each peg 15 is also calibrated and has a cylindrical end part 15a allowing the peg 15 to be mounted coaxially inside the bushing 14, and each peg 15 is retained axially in the corresponding bushing 14 by a radially external step 15b at its opposite end to the cylindrical end piece 15a, and by means of which step the peg 15 is pressed into abutment against a radially internal step 14c by means of which a tapped bore formed coaxially in the frustoconical end part 14b connects with the smaller-diameter central bore of the bushing 14. The peg 15 is held pressed by its step 15b against step 14c of the bushing 14 by a threaded plug 16 screwed into the tapped bore of the bushing 14 and in such a way that an end part of the cylindrical end piece 15a of the peg 15 is visible projecting axially out of the bushing 14 beyond its step 14a to act as a centering end piece engaged in one respectively of two corresponding centering houses formed on the opposing faces of a body opposite which the two bushings 14 exhibit their radially external shoulder 14a and which, as represented in FIGS. 2a, 3a, 3b and 4, is the lateral part 18a of the body 18 of a combined actuator for maneuvering the fitting 6 and the blade 3 in pivoting about the folding axis B—B and for locking the fitting 6 on the cuff 5 in the flight configuration. As may be seen in FIGS. 3b and 4, this lateral part 18a of the actuator body 18 is retained on the cuff 5 between the pivot devises 11 and 12 of the cuff 5 and between the bearings 9 and 10 of the fitting 6, by being centered with respect to the folding axis B—B by the two subassemblies 13a and 13b forming the folding pivot. In these pivot sub-assemblies 13a and 13b mounted in opposition, the stepped bushings 14 by means of their outside diameter provide relative centering of the cuff 5 and of the fitting 6, and their radially external step 14a is preferably spaced a small axial clearance 49 away from the body 18a after the actuator body 18 has been mounted on the cuff 5 in order to avoid a statically-redundant mounting of the actuator body 18 which would be obtained if there were contact between the bushings 14 and the body 18a because the actuator body 18 is already positioned by the latches described herein below. For greater clarity, this clearance 49 between the steps 14a and the body part 18a is exaggerated in FIG. 4. Inside the bushings 14, the concentric pegs 15, after their centering end piece 15a has been inserted into the corresponding housing of the part 18a of the actuator body 18, provide centering of this body 18 with respect to the folding axis B—B, and positioning of this body in the plane between the steps 14a of the two bushings 14, the remaining angular freedom of the actuator body 18 being taken up and blocked by two steps 18b of the central part 18c of the actuator against locking devises of the cuff 5, as well as by a lateral blocking finger 18e of the actuator on the opposite side to its part 18a with respect to the axis X—X and which is housed between these locking devises as described herein below.

In order to counter any working-loose of the threaded plugs 16 which, in the example of FIG. 6, have a tightening head with a male and hexagonal shape 16a, a pin 17 is introduced into a bore which passes through the plug 16 substantially at right angles to the axis of the bushing 14 and of the peg 15 and is retained in stop cutouts 14d formed in the frustoconical part 14b of the bushing 14, at the periphery of its tapped bore. This safety pin 17 guarantees that the peg 15 is held in the bushing 14 and makes it possible to check the presence of the peg 15 which is invisible when each subassembly 13a or 13b is mounted (see FIG. 3b and 4). In the absence of the peg 15, if the plug 16 is screwed in until it comes into contact with the step 14c of the bushing 14, then the pin 17 can no longer be fitted in the plug 16.

In order to extract the peg 15 from the bushing 14, if need be, the end of the peg 15 on the same side as its step 15b has a tapped blind axial bore 15c intended to have extraction tooling (not represented) screwed into it.

Figure 7:
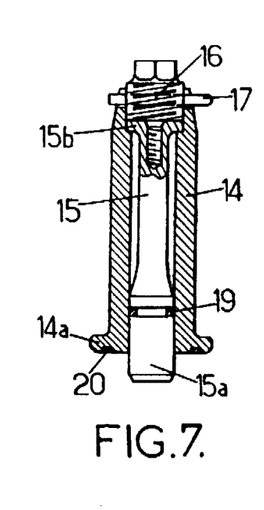
FIGS. 7 and 8 are views similar to the upper half view of FIG. 6 for alternative forms of a pivot subassembly.

The alternative form of pivot subassembly in FIG. 7 is intended to provide sealing on the one hand, between the peg 15 and the bushing 14 and, on the other hand, between the folding pivot and the actuator body 18. This alternative form therefore differs from each subassembly 13a or 13b of FIG. 6 only in the presence of a first 0-ring seal 19 in an annular groove of the cylindrical end piece part 15a of the peg 15 which remains inside the bushing 14 to provide sealing between the latter and the end piece 15a, and by the presence of a second 0-ring seal 20 in a groove formed in the bearing face of the radially external step 14a of the bushing 14 around the centering end piece 15a to provide sealing between the bushing 14 and the part 18a of the actuator body 18. Each of these 0-rings 19 and 20 may or may not be bonded into the annular groove which accommodates it.

Figure 8:
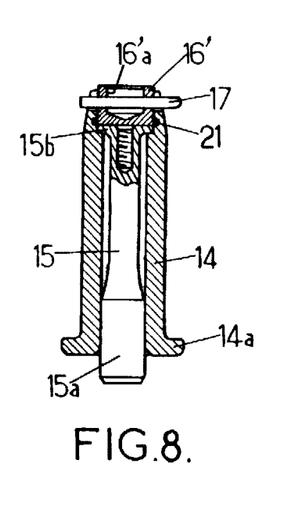

In the alternative form of pivot subassembly in FIG. 8, sealing on the inside of the bushing 14 is provided by an annular ring 21, for example of the type marketed under the trade name "NYLSTOP" mounted in the tapped bore of the bushing 14 around the threaded plug 16' which, in this alternative form, has a tightening head 16' a with a hexagonal female socket.

In order to lock the fitting 6 in the flight position (FIG. 1), the cuff 5 also exhibits, on the opposite side to the pivot clevises 11 and 12 with respect to its longitudinal axis X—X, and as may be seen in FIGS. 2a, 3a, 3b and 4, two locking devises 22 and 23 which are also lateral devises projecting substantially radially outward on the radially external end part of the cuff 5, but the two internal arms 22a or 23a and external arms 22b or 23b of which extend substantially along planes which are at right angles to those of the arms 11a, 11b, 12a, 12b of the pivot devises 11 and 12 on the other side of the cuff 5. The arms 22a and 22b or 23a and 23b have passing through them coaxial bores 24 or 25 the axis of which is at right angles both to the folding axis B—B and to the longitudinal axis X—X of the cuff 5.

Likewise, the fitting 6 has, on the opposite side to its lateral bearings 9 and 10 with respect to its longitudinal axis X'—X', two lateral lugs 26 and 27 which project parallel to the axis X'—X', on the opposite side to the clevis 6a and extend in planes substantially at right angles to those of the bearings 9 and 10, that is to say parallel both to the axis B—B and to the axis X'—X'. Each of the lugs 26 and 27 is pierced with a transverse bore 28 or 29 of axis substantially at right angles to the axis X'—X' and to the axis B—B, and the locking lugs 26 and 27 and devises 22 and 23 are arranged substantially symmetrically on each side of the plane of rotation of the blade 3, so that in the unfolded position (FIGS. 1 and 4), each lug 26 or 27 points toward the cuff 5 and is housed in the cavity, which is open substantially radially toward the outside, of the cuff 5 and delimited between the two arms 22a and 22b or 23a and 23b of the corresponding locking clevis 22 or 23 and so that when the ends of the internal arms 22a and 23a come into abutment against the bottom of the clevis 6a of the fitting 6, the transverse bores 28 and 29 are aligned respectively with the transverse bores 24 and 25 respectively of the devises 22 and 23 (see FIG. 1), in this position, each lug 26 or 27 can be retained in the corresponding locking clevis 22 or 23 by a cylindrical locking rod 30 or 31 (FIG. 4) passing through the aligned bores 24 and 28 or 25 and 29 and which can be retracted axially into an upper stage 32 or lower stage 33 of a locking actuator which is, for example, an electromechanical actuator, housed in the actuator body 18. Each locking rod 30 or 31 is integral with a slide 34 or 35 driven in translation into the upper stage 32 or lower stage 33 of the locking actuator from one of two limiting positions to the other, one of which positions is the locked position of FIG. 4 for flight and the other the unlocked position releasing the lug 26 or 27 and in which the locking rod 30 or 31 is retracted into the corresponding locking clevis internal arm 22a or 23a, whereas for mounting the actuator in the cuff 5, the rod 30 or 31 is completely retracted into the actuator body 18, the locking actuator simultaneously shifting the two locking rods 30 and 31. As may also be seen in FIG. 2b, the locking actuator, which may be an electromechanical actuator of any suitable type known for causing translational motion of the rods 30 and 31 with their slide 34 and 35 is housed in a central part 18c of the actuator body 18 which central part is housed between the pivot devises 11 and 12 on one side of the cuff 5 and between the locking devises 22 and 23 on the other side of this cuff 5 (see FIGS. 3a, 3b and 4). This central part 18c of the actuator body 18 exhibits the two steps 18b mentioned herein above, bearing against the internal arms 22a and 23a of the locking devises 22 and 23 in order to block in terms of rotation on the cuff 5 the actuator body 18 which also comprises, on the opposite side to its lateral part 18a which interacts with the bushings 14 and centering pegs 15 as described herein above, a parallelepipedal blocking finger 18e between the two devises 22 and 23 and a substantially cylindrical radially internal part 18b which is housed in the tubular part 5a of the cuff 5.

The maneuvering actuator also housed in the body 18 makes it possible, when the locking actuator has unlocked the lugs 26 and 27 of the fitting 6 by retracting the latch rods 30 and 31, to pivot the fitting 6 and the blade 3 by a maximum angle of, for example, 135° about the axis B—B of the pivot articulation which is offset laterally with respect to the longitudinal axis X—X of the cuff 5 between the flight position (FIG. 1) in which the common longitudinal axis X'—X' of the fitting 6 and the blade 3 is aligned with that X—X of the cuff 5, and the blade 3 and the fitting 6 are in the radial extension of the cuff 5, and the folded position in which the blade 3 and the fitting 6 are folded back by pivoting on that side of the cuff 5 toward which the folding articulation is offset (see FIG. 3b).

The maneuvering actuator is, for example, an electromechanical actuator including a geared motor unit, the electric motor of which is housed in the cylindrical internal part 18d of the actuator body 18 which part is housed in the tubular central part 5a of the cuff 5, the reduction stage on the output side of the electric motor of the maneuvering actuator being a mechanical stage with two pinions, for example, and housed in the central part 18c of the body 18 between the two locking stages 32 and 33 and in the lateral part 18a of this actuator body 18.

As represented diagrammatically in FIGS. 4 and 5, this mechanical stage comprises a driving pinion 36 mounted so that it can rotate in the central part 18c of the actuator body 18 and driven by the electric motor, and in mesh with a driven pinion 37 which constitutes the rotary output member of the maneuvering actuator and is mounted so that it can rotate in the lateral body part 18a. By virtue of the fact that this part 18a is centered by the pegs 15 of the bushings 14 of the pivot, this output pinion 37 is driven in rotation about the folding axis B—B. The output pinion 37 has a radial boss 38 which projects through an opening made in the body part 18a (see FIGS. 3a and 3b) revealing part of the radially external periphery of the pinion 37. This boss 38 supports a driving finger 39 which is radial with respect to the folding axis B—B and by means of which the pinion 37 and the boss 38 drive in coaxial rotation an aperture 40 carried by the bottom of the clevis 6a of the fitting 6 and projecting on the side of the cuff 5. The driving finger 39 comprises a bushing 41 which passes through the aperture 40 of the fitting 6 and is fitted snugly inside a radial bore of the boss 38, against which it bears via a radially external step, and the bushing 41 is fixed to the boss 38 by a central rod 42 which passes through it and is screwed into the boss 38. At its end which is not engaged in the boss 38, the bushing 41 has a second radially external step 43 forming a stop for axially retaining the bushing 41 in the aperture 40 of the fitting 6 so as to obtain permanent coupling between the fitting 6 and the output pinion 37 of the actuator in order to guarantee the rotational driving of the fitting 6 and therefore of the blade 3 by this pinion 37.

To mount and dismantle the driving finger 39 in order to couple or uncouple the fitting 6 and the pinion 37, the fitting 6 is locked on the cuff 5 by its lugs 26 and 27, then the spindle 8 for retaining the blade root 3a in the fitting 6 on the same side as the locking lugs 26 and 27 is withdrawn and the blade 3 is pivoted about the other spindle 8 on the fitting 6, which makes it possible to access the bottom of the clevis 6a and the aperture 40 of the fitting 6 in order to fit the driving bushing 41 in the aperture 40 and in the boss 38 then screw the threaded fixing rod 42 in or, conversely, to withdraw this rod 42 and extract the bushing 41, possibly using a threaded tool screwed into an extraction tapping in the end of the central bore of the bushing 41 on the same side as its step 43.

In addition, screwing in the rod 42 makes it possible to clamp down against the bushing 41 an electrically conducting metal washer 44 which is equipped laterally with a spring leaf 45 bent into the shape of a crook held in elastic contact against part 46a of a tape 46 made of copper or some other electrically conducting metal which runs around the lateral face of the blade root 3a and extends along the span of the blade 3 for removing electrostatic charge and allowing lightning currents to pass, the part 46a of this tape 46 known as metallization tape being visible on the radially internal end of the blade root 3a, directly facing the bottom of the clevis 6a in which this blade root 3a is retained by the spindles 8.

Thus electrical continuity between the metallization tape 46 of the blade 3 and the cuff 5 is ensured by means of the spring leaf 45, the washer 44, the bushing 41 and the rod 42, the boss 38 and the pinion 37 and the actuator body 18 fixed to the cuff 5, which are electrically conducting metallic elements, the electrical continuity between the cuff 5 and the hub 2 being provided by other means which are known for this purpose.

Figure 10A:
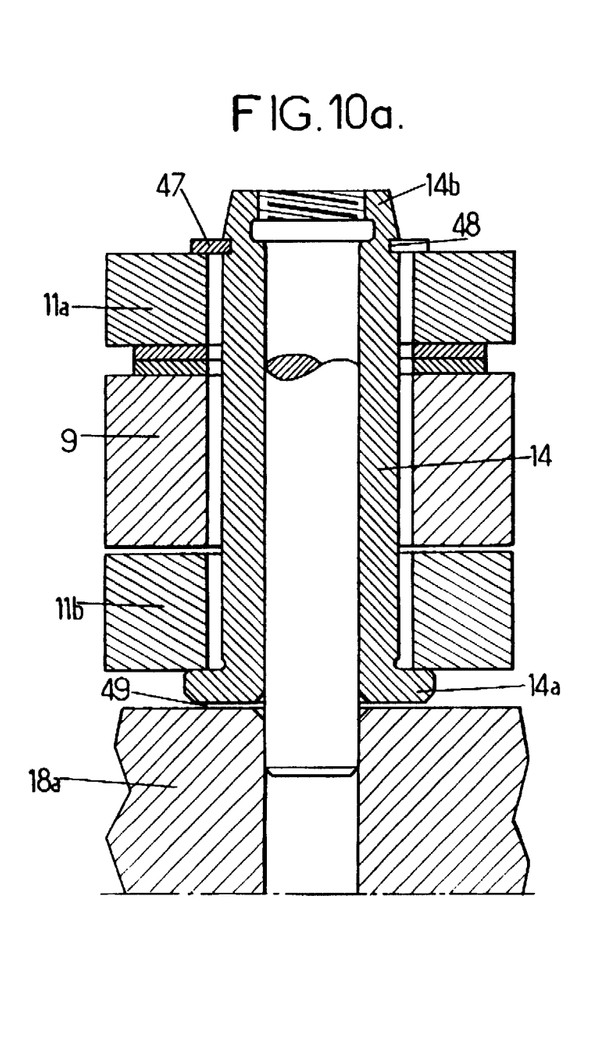
FIGS. 10a and 10b are partial views in section and in side elevation of alternative forms of tooling used to retain at least one bushing of the device for mounting the actuator.

As regards mounting the assembly it is necessary, first of all, to offer up the bearings 9 and 10 of the fitting 6 into the pivot devises 11 and 12 of the cuff 5 (see FIG. 2a) then to slip the two bushings 14 in opposition into the aligned bores of the bearings 9 and 10 and of the arms of the devises 11 and 12, the pegs 15 of the bushings 14 being retracted or absent. Spacer tooling is then mounted between the steps 14a of the two bushings 14 in order to hold them in position and prevent the upper bushing 14 from dropping out. As an alternative, and instead of the spacer tooling, a circlip 47 (see Figure 10a) may be mounted in an external peripheral annual groove 48 around the base of the frustoconical end part 14b of at least the upper bushing 14 or of each bushing 14 and bearing against the axially external face respectively of the upper arm 11a of the upper clevis 11 or of the lower arm 12b of the lower clevis 12 in order axially to retain the corresponding bushing 14 in an appropriate position for mounting the actuator body part 18a between the bushings 14 with axial clearance 49 between the steps 14a of the bushings 14 and this body part 18a.

Figure 10B:
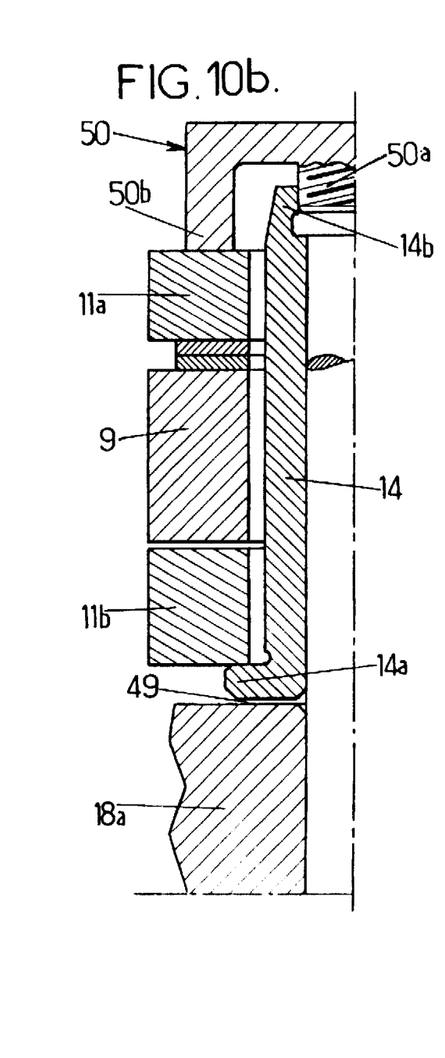

Axial retention at least of the upper bushing 14 to prevent it from dropping out and allowing the actuator body to be mounted by giving the same clearance 49 between the step 14a and the body part 18a may be provided according to the alternative form of Figure 10b using a plug 50 which is used as tooling, screwed via its central part 50a which projects axially and is externally threaded, into the tapped bore provided in the frustoconical end part 14b of the bushing 14 for the threaded plug 16, and bearing via its annular peripheral part 50b which also projects axially against the external face of the upper arm 11a of the upper clevis 11 of the cuff 5, the internal face of the lower arm 11b of this same clevis 11 bearing axially against the corresponding step 14a, in all the examples of mounting. The maneuvering and locking actuators housed in their body 18 (FIG. 2b) are offered up to the cuff 5 in such a way as to insert the cylindrical part 18d of the body 18 into the tubular part 5a of the cuff 5, the lateral part 18a of the body 18 between the two bushings 14, possibly in place of the spacer tooling, the central part 18c of the body 18 between the pivot devises 11 and 12 and the locking devises 22 and 23 of the cuff 5, and the finger 18e between the devises 22 and 23 as mentioned herein above (see FIG. 3a). The centering pegs 15 are then pushed into the bushings 14 in order to introduce the centering end pieces 15a into the receiving housings of the lateral part 18a of the body 18 in order to center this body 18 in such a way that the output pinion 37 is indeed driven in rotation about the folding axis B—B. The plugs 16 are then screwed with the given tightening torque and the pins 17 put in place. The locking rods 30 and 31 in the bores 24, 25 and 28, 29 of the locking devises 22 and 23 and of the lateral lugs 26 and 27 act as centering in the direction of the folding axis (axial direction), and this is allowed because of the clearances 49 between the steps 14a of the bushings 14 and the part 18a of the actuator body, in order to avoid a statically-redundant mounting of this body.

Next, as described above, the blade 3 is pivoted with respect to the fitting 6, by removing a spindle 8 in order to couple the fitting 6 to the boss 38 of output pinion 37 by virtue of the driving finger 39, bushing 41 and threaded rod 42, as described herein above (FIG. 3b).

The folding device thus produced allows safety fastening of the fitting 6 to the cuff 5, this fastening remaining non-dismantleable during maneuvers about the folding axis B—B. What is more, this device is compact, relatively lightweight, and does not in any way hamper the kinematics of folding and unfolding the blade.

Figure 2B:
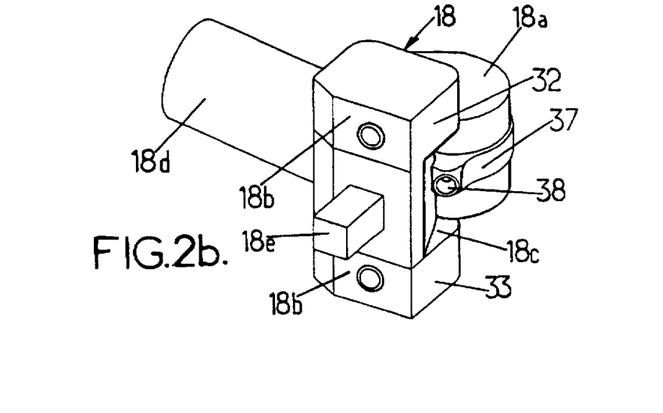

If it is assumed that the front of the helicopter is to the front in FIG. 1, the folding device of FIGS. 2a, 3a, 3b, 4 and 5 equipped with the actuator of FIG. 2b makes it possible to fold the blade 3 to the left (with respect to the longitudinal axis of the helicopter) and toward the rear of the helicopter.

This may be necessary in respect of two of the four blades of a four-bladed main rotor at rest on a helicopter loaded on board a ship, the other two blades of which have also to be folded toward the rear of the helicopter, but on the right-hand side thereof.

Figures 9A, 9B:
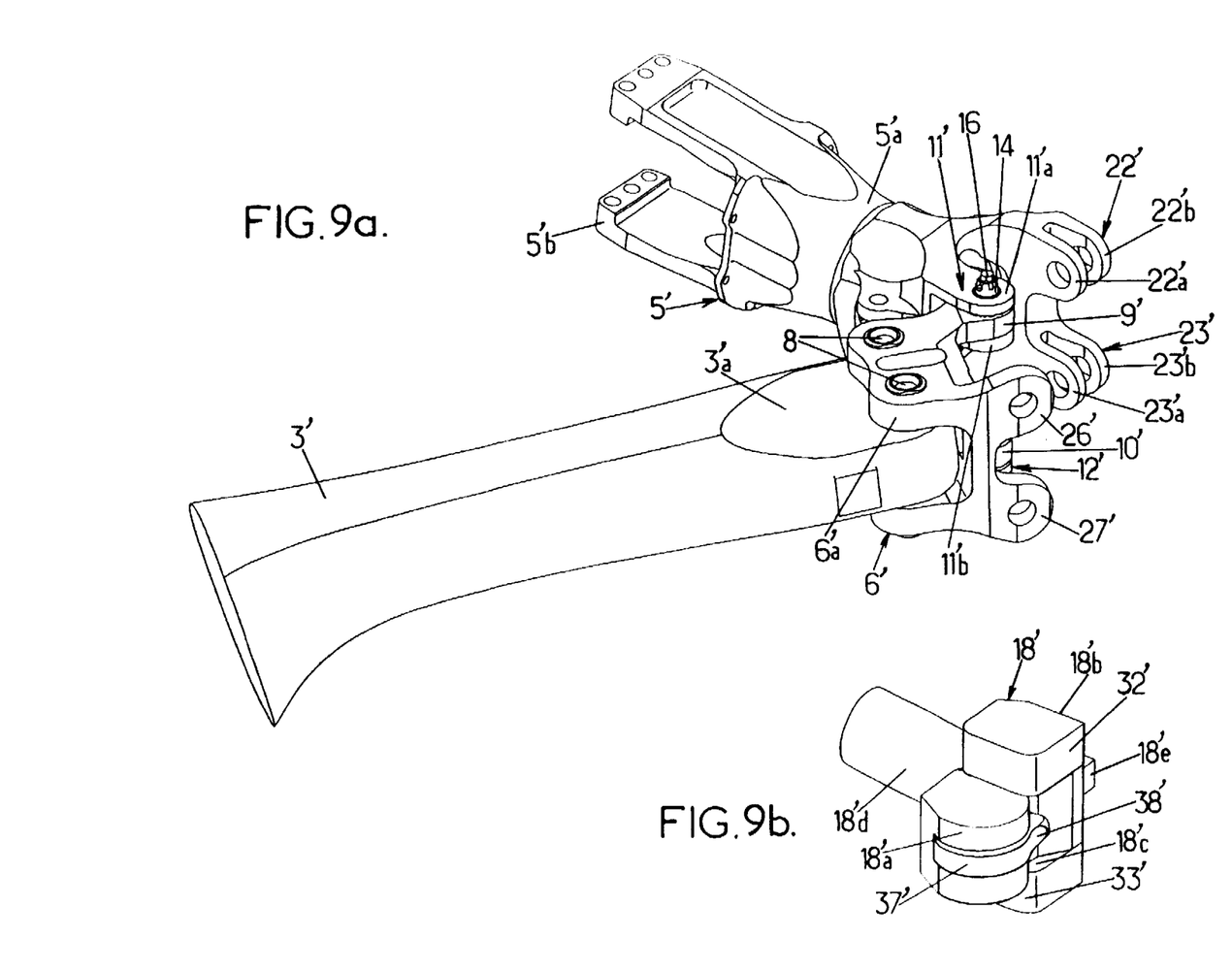
FIG. 9a and 9b are views similar respectively to FIGS. 2a and 2b for a folding device with actuator for folding the blade on the other side of the linking member.

To maneuver and lock each of these two blades 3' to be folded back on the right-hand side, the device of FIG. 9a equipped with the actuator 18' of FIG. 9b is used, this device and this actuator 18' differing from those of FIGS. 2a and 2b only in the way that they are symmetric with respect to the plane passing through the longitudinal axis X—X of the cuff or X'—X' of the fitting and of the blade and parallel to the folding axis B—B, which means that the analogous components are denoted in FIGS. 9a and 9b by the same numerical references as respectively in FIGS. 2a and 2b, but with a prime symbol added.

In FIG. 9a, it may thus be seen that the two lateral pivot devises 11' and 12' and the two lateral locking clevises 22' and 23' of the cuff 5' occupy lateral positions which are the reverse of those of the pivot devises 11 and 12 and locking devises 22 and 23 of the cuff 5 of FIG. 2a. Likewise, on the fitting 6', the lateral positions of the bearings 9' and 10' and of the locking lugs 26' and 27' are the reverse of those of the bearings 9 and 10 and of the lugs 26 and 27 of the fitting 6 of FIG. 2a, but their interaction with the corresponding devises of the cuff 5' takes place in the same way, particularly with the aid of identical pivot subassemblies with bushings 14. In consequence, the combined actuator 18' of FIG. 9b has a symmetric structure capable, with its internal cylindrical part 18'd which is housed in the tubular part 5'a of the cuff 5', and the two locking stages 32' and 33' of its central part 18'c, of blocking the lugs 26' and 27' of the fitting 6' in the locking devises 22' and 23' of the cuff 5', its lateral blocking finger 18'e being housed between the two devises 22' and 23' of the cuff 5', and its lateral part 18'a in which the output pinion 37' turns driving, in rotation about the folding axis, the boss 38' intended to support a finger for driving the fitting 6' and the blade 3' held by its root 3'a in the clevis 6'a of this fitting 6' for the maneuvers of folding and unfolding the blade 3' as described hereinabove with respect to the blade 3'. Indeed, the driving link between the boss 38' of the pinion 37' and the fitting 6' may be achieved in an identical way, using a bushing fitted snugly and fixed by a threaded central rod inside the boss 38', this bushing passing through an aperture in the bottom of the clevis 6'a of the fitting 6' and being retained axially in this aperture in order to drive the fitting 6' and the blade 3' in rotation.

We claim:

1. A device for folding a blade of a rotorcraft rotor comprising a hub mounted so that the hub can rotate about an axis of the rotor, and to which hub each blade is connected by a linking member which is substantially radial with respect to the axis of the rotor and is itself connected to the hub by retaining and articulating means, each blade being secured by a root to a folding fitting mounted so that said fitting can pivot about a folding axis on said linking member, between two positions, one of which is a flight position in which the fitting is fixed to said linking member in such a way that the blade is aligned via its longitudinal axis with a longitudinal axis of said linking member and in the substantially radial extension of said linking member, and the other of which is a folded position, in which the fitting and the blade are pivoted about the folding axis substantially on one side of said linking member, the folding device including a pivoting articulation which is offset laterally with respect to the longitudinal axis of the linking member, and by means of which the fitting is mounted so that it can pivot on the linking member about the folding axis, the articulation comprising, on the linking member just as on the fitting, two lateral bearings, secured respectively to one and the same side of the linking member and of the fitting and which are coaxial about the folding axis while at the same time being axially offset from one another along this folding axis, and two stepped bushings are mounted coaxially about the folding axis, each in respectively one of the two lateral bearings of the linking member and in respectively one of the two lateral bearings of the fitting, the two bushings also being mounted in opposition, each having a radially external step at its end pointing toward the other bushing, and facing a body retained on the linking member between the two bearings thereof and between the two bearings of the fitting, and a centering peg being mounted coaxially and retained axially in each of the two bushings in such a way that an end part of the peg projects axially out of the bushing beyond its step and is engaged and centered in respectively one of two corresponding centering housings of said body.

2. The folding device as claimed in claim 1, wherein each of the two lateral and coaxial bearings of the linking member is a double bearing formed by respectively one of two radially external and lateral pivot devises arranged on said linking member on each side of a plane at right angles to the folding axis and passing through the longitudinal axis of said linking member, and each of the two lateral and coaxial bearings of the fitting is journal-mounted between two arms of respectively one of the two pivot devises and about respectively one of the two bushings which passes through coaxial passages formed in said arms of the corresponding pivot clevis.

3. The folding device as claimed in claim 1, wherein each peg is retained axially in the corresponding bushing by a step of the peg pressed into abutment against an internal step of said bushing under the thrust of a threaded plug screwed into a tapped bore formed in the end of the bushing on the opposite side to its step for bearing on the body.

4. The folding device as claimed in claim 3, wherein said plug has passing through it substantially at right angles to the axis of the bushing and of the peg, a safety pin retained in cutouts formed at the periphery of the tapped bore of the bushing.

5. The folding device as claimed in claim 3, wherein the end of each peg on the same side as the corresponding threaded plug exhibits a tapped blind axial bore intended to accommodate, by screwing, tooling for extracting the peg from the corresponding bushing.

6. The folding device as claimed in claim 3, wherein at least one sealing ring is mounted in the tapped bore of the bushing, around the threaded plug.

7. The folding device as claimed in claim 1, wherein at least one annular seal is mounted between the bushing and part of the corresponding peg inside this bushing, and at least one other annular seal is mounted, around the peg, in the bearing face of the radially external step of the bushing.

8. The folding device as claimed in claim 1, wherein the fitting has, on the opposite side to its two lateral bearings at least one lateral lug which, in the flight position, points toward said linking member and is housed in a cavity open radially toward the outside on said linking member and is retained in said cavity by a catch of an actuator for locking the fitting on the linking member in the flight position.

9. The folding device as claimed in claim 8, wherein said cavity of the linking member is delimited between two arms of a radially external locking clevis arranged laterally on said linking member and the two arms of which have passing through them coaxial passages of axis substantially at right angles to the folding axis and to the longitudinal axis of said linking member, said corresponding lug of the fitting extending in a plane substantially parallel to the common longitudinal axis of the fitting and of the blade and to the folding axis, and being pierced with a transverse passage of axis substantially at right angles to said longitudinal axis common to the blade and to the fitting and to said folding axis, said lug being retained in said locking clevis of the linking member by a locking rod which can be retracted axially by the locking actuator and is intended to pass through the coaxially-aligned passages of the locking clevis and of the lug, in the flight position.

10. The folding device as claimed in claim 9, which comprises two locking lugs on the fitting, two locking devises on the linking member, as well as two locking rods of at least one electromechanical locking actuator arranged on the linking member between the two lateral bearings on one side and the two lateral locking devises on the other side of the longitudinal axis of said linking member, said lugs, devises and locking rods being arranged on each side of the plane at right angles to the folding axis and passing through the longitudinal axis respectively of the linking member and of the fitting and the blade.

11. The folding device as claimed in claim 1, wherein said body between the two stepped bushings is a body of a maneuvering actuator driving the fitting and the blade in pivoting about the folding axis, and at least partially housed in part shaped as a cuff of the linking member, said maneuvering actuator comprising a moving output member mounted so that it can rotate about the folding axis and driving in coaxial rotation a driven member integral with the fitting.

12. The folding device as claimed in claim 11, wherein said mobile output member of the maneuvering actuator comprises a driving finger which is substantially radial with respect to the folding axis and said driven member is an aperture in the fitting, through which the driving finger passes.

13. The folding device as claimed in claim 12, wherein said finger is a driving bushing equipped with at least one stop for axially retaining the bushing in the aperture of the fitting and which is fixed on a radial boss of an output rotary member of the drive actuator by a threaded central rod passing through the bushing partially fitted snugly into said boss and screwed into said boss.

14. The folding device as claimed in claim 13, wherein the fitting includes a radially external clevis, a clevis bottom of which has said aperture, and in which the blade root is retained by two spindles which are substantially mutually parallel and parallel to the folding axis, one of which spindles can be removed to give access to the threaded rod for fixing the driving bushing by pivoting the blade on the fitting about the other spindle.

15. The folding device as claimed in claim 14, for a blade equipped with a device for discharging electrostatic charge and allowing lightning current to pass, which comprises an electrically conducting element visible on the radially internal end of the blade root facing the bottom of the outer clevis of the fitting, wherein the rod for fixing the driving bushing has a head clamped against said bushing with the interposition of an electrically conducting washer equipped with a curved leaf spring kept in elastic contact with said electrically conducting element of the blade root, thus placed in electrical continuity with the linking member via the washer and the leaf spring, the fixing rod and/or the drive bushing, the boss and the output rotary member of the maneuvering actuator.

16. The folding device as claimed in claim 11, wherein the maneuvering actuator and each of the locking actuators have a common body mounted on said linking member.

* * * * *